United States Patent
Chan et al.

(10) Patent No.: US 10,442,479 B2
(45) Date of Patent: Oct. 15, 2019

(54) MOVING MECHANISM AND ELECTRIC VEHICLES AND TOYS EQUIPPING THE SAME

(71) Applicant: Lai Ping Aubrey Chan, Hong Kong (CN)

(72) Inventors: Lai Ping Aubrey Chan, Hong Kong (CN); Siu Lun Lee, Hong Kong (CN)

(73) Assignee: LAI PING AUBREY CHAN, Hong Kong (CN)

( * ) Notice: Subject to any disclaimer, the term of this patent is extended or adjusted under 35 U.S.C. 154(b) by 150 days.

(21) Appl. No.: 15/501,322

(22) PCT Filed: Aug. 31, 2016

(86) PCT No.: PCT/IB2016/055191
§ 371 (c)(1),
(2) Date: Feb. 2, 2017

(87) PCT Pub. No.: WO2017/037626
PCT Pub. Date: Mar. 9, 2017

(65) Prior Publication Data
US 2017/0217514 A1   Aug. 3, 2017

(30) Foreign Application Priority Data

Sep. 1, 2015   (CN) .......................... 2015 1 0555652

(51) Int. Cl.
*B62D 55/075*   (2006.01)
*B60N 2/75*   (2018.01)
(Continued)

(52) U.S. Cl.
CPC .......... *B62D 55/075* (2013.01); *A61G 5/041* (2013.01); *A61G 5/046* (2013.01); *A61G 5/061* (2013.01);
(Continued)

(58) Field of Classification Search
CPC ........ A61G 5/006; A61G 5/041; A61G 5/046; A61G 5/061; A61G 5/066; A61G 5/125;
(Continued)

(56) References Cited

U.S. PATENT DOCUMENTS

| | | | |
|---|---|---|---|
| 2006/0037789 A1* | 2/2006 | Kritman | A61G 5/061 180/9.32 |
| 2008/0093131 A1* | 4/2008 | Couture | B25J 5/005 180/9.1 |
| 2014/0034400 A1* | 2/2014 | Underwood | B62D 55/02 180/9.34 |

FOREIGN PATENT DOCUMENTS

| | | |
|---|---|---|
| CN | 103027803 | 4/2013 |
| CN | 104002880 A | 8/2014 |

(Continued)

*Primary Examiner* — Ann Marie M Boehler
*Assistant Examiner* — Felicia L. Brittman
(74) *Attorney, Agent, or Firm* — Muncy, Geissler, Olds & Lowe, PC

(57) ABSTRACT

A moving mechanism includes a support; a driving device mounted on the support; a controller arranged on the support; two sets of moving assemblies respectively mounted at two ends of the support; wherein each of the moving assemblies includes a track and two synchronous wheels of different diameters arranged inside the track, such that the moving mechanism is functioned and run freely over stairs, rugged road surfaces and all-terrain ground under the action of the driving device and the controller. Besides, the moving mechanism is equipped on electric vehicles and toys. The moving mechanism applies a breakthrough composite structure of a half-wheel-half-track configuration in combination with an additional omni-directional wheel, whereby the moving mechanism and the electric vehicles and toys equipping the same are adaptable to different road surfaces and stairs of various angles, and also convenient and reliable to use.

17 Claims, 13 Drawing Sheets

(51) Int. Cl.
  *A61G 5/12* (2006.01)
  *A61G 5/04* (2013.01)
  *A61G 5/06* (2006.01)
  *A61G 5/10* (2006.01)
  *B60N 2/02* (2006.01)
  *B60N 2/04* (2006.01)
  *B60N 2/14* (2006.01)
  *B60N 2/16* (2006.01)
  *B62D 55/02* (2006.01)
  *B62D 55/065* (2006.01)
  *B62D 55/26* (2006.01)
  *B62D 55/084* (2006.01)
  *B60N 2/39* (2006.01)

(52) U.S. Cl.
  CPC ........... *A61G 5/066* (2013.01); *A61G 5/1059* (2013.01); *A61G 5/1072* (2013.01); *A61G 5/1075* (2013.01); *A61G 5/125* (2016.11); *B60N 2/0232* (2013.01); *B60N 2/0244* (2013.01); *B60N 2/04* (2013.01); *B60N 2/14* (2013.01); *B60N 2/16* (2013.01); *B60N 2/39* (2013.01); *B60N 2/75* (2018.02); *B62D 55/02* (2013.01); *B62D 55/065* (2013.01); *B62D 55/084* (2013.01); *B62D 55/26* (2013.01)

(58) Field of Classification Search
  CPC .. A61G 5/1059; A61G 5/1072; A61G 5/1075; B60N 2/04; B60N 2/14; B60N 2/16; B60N 2/39; B60N 2/75; B60N 2/0232; B60N 2/0244; B62D 55/02; B62D 55/26; B62D 55/065; B62D 55/084; B62D 55/075
  USPC ....................................................... 180/9.34
  See application file for complete search history.

(56) References Cited

FOREIGN PATENT DOCUMENTS

| | | |
|---|---|---|
| CN | 104071242 A | 10/2014 |
| KR | 101139342 B1 | 4/2012 |
| KR | 20120032863 A | 4/2012 |

* cited by examiner

MOVING MECHANISM AND ELECTRIC VEHICLES AND TOYS EQUIPPING THE SAME

TECHNICAL FIELD

The present invention relates to a moving mechanism, and more particularly, to a tracked moving mechanism capable of going up and down stairs of various slopes, ramps, or climbing over obstacles, or moving on rugged/rough roads in a safe manner, and to electric vehicles and toys equipping the moving mechanism.

BACKGROUND ART

Crawler moving mechanisms are commonly used in devices, such as in wheelchairs or toys for driving them to move on the road. Such conventional moving mechanisms can only move on smooth paved roads and being powerless to move on complex non-paved roads with various road conditions due to their own design features. For example, such conventional moving mechanisms do not function properly or might occasionally bring about danger to users when operating on rugged uneven roads or obstacles of various height, or going up and down ramps or even stairs of various slopes.

As shown in FIG. 1a, the crawler moving mechanism 1000, comprising the crawler/caterpillar/track 1100 and the wheel 1200, might fail to climb up and be stuck in the midway or have a danger of sudden fall, when climbing stairs of various slopes;

as illustrated in FIG. 1b, when reaching the top of the stairway, there might be a danger of sudden fall; and as illustrated in FIG. 1c, though the crawler moving mechanism 1000 has the tank-like crawler assembly 1100 and 1200 and can move on rough terrain and climb over obstacles, but it has a drawback as a tank does, namely it has also a danger of sudden fall when crossing a protrusion. When the crawler moving mechanism moves on an even running surface, and each time it turns, crawlers at both sides will press closely against the surface, so the turning is extremely unsmooth and uneasy, and the crawler might also cause damage to the surface as it will scratch the surface badly during turning.

To this end, those skilled in the art have proposed also a number of solutions. For example, CN103027803 A has disclosed an electric vehicle comprising a movable seat part, a body part served as a support for the seat part, a seat adjustment mechanism arranged under the seat part, a bottom part, and a crawler moving mechanism. The crawler moving mechanism comprises two sets of crawlers arranged respectively at both sides underneath the bottom part, and each of which comprises a front crawler and a rear crawler. The bottom part is comprised of a front portion and a rear portion, which are movably connected with a coupling arrangement and capable of deflection with respect to each other. The crawler moving mechanism further comprises movable stretching crawlers arranged respectively at outside of the front crawler, and fixed stair-climbing crawlers arranged respectively at outside of the rear crawler, wherein a free end of the fixed stair-climbing crawler forms a specific angle relative to the rear crawler. It makes use of several crawler moving mechanisms and a balance device to realize the moving over the non-paved road, and it has produced certain technical effects, but it is relatively bulky and costly per se.

Obviously, the foregoing designs have posed heavy limits to application and development of those wheelchairs or toys. Therefore, it is necessary to design a new moving mechanism, which has not only the capabilities of the traditional moving mechanisms, but also the capabilities of climbing stairs of various slopes, moving easily on rugged roads, crossing various obstacles without causing danger, and the like.

BRIEF SUMMARY OF INVENTION

According to one aspect of the present disclosure, one of the objects of the present disclosure is to solve various technical problems existed in the prior art by providing a new moving mechanism, which has not only the capabilities of the traditional moving mechanisms, but also the capabilities of climbing stairs of various slopes, moving easily on rugged roads, and crossing various obstacles without causing danger.

According to another aspect of the present disclosure, one object of the present disclosure is to solve various technical problems existed in the prior art by providing a new electric vehicle equipping the moving mechanism of the present disclosure, which has not only the capabilities of the traditional moving mechanisms, but also the capabilities of climbing stairs of various slopes, moving easily on rugged roads, crossing various obstacles without causing danger, and the like.

According to yet another aspect of the present disclosure, one object of the present disclosure is to solve various technical problems existed in the prior art by providing a new toy equipping the moving mechanism of the present disclosure, which has not only the capabilities of the traditional moving mechanisms, but also the capabilities of climbing stairs of various slopes, moving easily on rugged roads, crossing various obstacles without causing danger, and the like.

To achieve the above objects, the present disclosure adopts the following technical solutions:

a moving mechanism, comprising:
a support;
a driving device mounted on the support;
a controller arranged on the support;
two sets of moving assemblies respectively mounted at two ends of the support; wherein each of the moving assemblies includes a track and two synchronous wheels of different diameters arranged inside the track, such that the moving mechanism could be functioned and move freely over stairs, rugged road surface and all-terrain ground under action of the driving device and the controller.

According to one of the embodiments, the two synchronous wheels of different diameters are both mounted on an axle, such that the two synchronous wheels of different diameters are rotated concurrently.

According to one of the embodiments, the two synchronous wheels of different diameters are respectively provided with a fixing plate, which allows the axle to rotate with respect to the fixing plate via a bearing.

According to one of the embodiments, a synchronous track is arranged between the moving assemblies, so as to implement synchronous transmission of power between the synchronous wheels.

According to one of the embodiments, a synchronous wheel connector is arranged between the two synchronous wheels of different diameters, so as to transfer power between the two synchronous wheels of different diameters.

According to one of the embodiments, the moving mechanism further comprises a forearm drive axle mounted on the support and arranged between the two synchronous wheels of different diameters.

According to one of the embodiments, the forearm drive axle is connected with the fixing plate at both ends, so as to make the fixing plate swing when the forearm drive axle rotates.

According to one of the embodiments, the moving mechanism further comprises a forearm motion mechanism comprising a first forearm driving electric push rod and a second forearm driving electric push rod connected with the forearm drive axle, so as to drive the forearm drive axle to rotate/swing.

According to one of the embodiments, the moving mechanism further comprises an omni-directional wheel connected with the forearm drive axle via a connecting member, so as to swing when driven by the forearm motion mechanism.

According to one of the embodiments, a plurality of teeth are arranged on the track.

The present disclosure has also disclosed an electric vehicle comprising a body part and a seat, characterized in that, further comprising anyone of foregoing moving mechanism, such that the electric vehicle moves freely over stairs, rugged road surface and all-terrain ground surface by making use of the moving mechanism.

In one embodiment of the electric vehicle of the present disclosure, the electric vehicle further comprises a seat adjustment mechanism connected with the seat and configured to effect an up and down adjustment of the seat in a direction perpendicular to the body part, or a horizontal adjustment of the seat in a direction parallel to the body part, or an adjustment of the seat in a rotary manner, so that the seat is moved up and down and left and right, or rotatably adjusted in directions from 0° to 360°, such as 90°, 180°, or 360°.

In one embodiment of the electric vehicle of the present disclosure, the seat adjustment mechanism comprises a seat balance mechanism comprising:

a seat balance push rod arranged under the seat to drive the seat to move in one direction or two directions;
a balance sensing element for sensing an information on whether the seat is deviated, and transmitting the information to a control unit; and;
the control unit is electrically connected with the seat balance push rod and the balance sensing element to receive the information transmitted by the balance sensing element, and control the seat balance push rod according to the information, so as to maintain balance of the seat.

In one embodiment of the electric vehicle of the present disclosure, the balance sensing element is a gyroscope.

In one embodiment of the electric vehicle of the present disclosure, the seat adjustment mechanism comprises a seat rotation mechanism comprising:

a connecting bracket fixedly connected with one end of the seat of the seat balance push rod;
a driving device mounted on the connecting bracket;
a swivel bracket connected with the connecting bracket at a joint, at which a ball bearing is arranged; and
a screw rod arranged at one end of the driving device and driven by the driving device to rotate, and drive the swivel bracket to rotate.

In one embodiment of the electric vehicle of the present disclosure, the seat adjustment mechanism further comprises a gear arranged at one end of the swivel bracket, and rotated collaboratively with the screw rod.

In one embodiment of the electric vehicle of the present disclosure, the driving device is a deceleration motor.

In one embodiment of the electric vehicle of the present disclosure, the electric vehicle further comprises an armrest arranged at the support, and positioned in front of the seat for easy grip of the user and allowing the electric vehicle to be controlled by the user via a button arranged on the armrest.

The present disclosure has also disclosed a toy comprising anyone of foregoing moving mechanism, such that the toy moves freely over stairs, rugged road surface and all-terrain ground surface by making use of the moving mechanism.

By combining the foregoing newly designed features of moving mechanism, one could make the functionality of a new moving mechanism to be greatly expanded and enhanced.

The moving mechanism of the present disclosure adopts a half-track-half-wheel approach, which combines the benefits of track and wheels with a novel concept of operation, whereby being adaptable to different road surfaces and stairs of various angles, and being safe without causing any danger. The present disclosure is newly equipped with a pair of omni-directional wheels, and the moving mechanism could be adapted to various road conditions by a wide angle utilization of the benefits of the omni-directional wheels. In addition, the present disclosure adopts the electric push rod as the motion source for enabling the forearm to be stopped freely at any location without any additional safety lock.

The seat balance mechanism of the electric vehicle employing the moving mechanism of the present disclosure is provided with an electric push rod, which will elevate the seat when going up and down the stairs, such that the seat could swing back a significant amount to make the center of gravity of the rider to be biased to rear to improve the safety thereof. The seat rotation mechanism enables the rider to interchange the front end and the rear end of the vehicle, or to rotate the seat to any desired position in a convenient and flexible manner.

The toy employing the moving mechanism of the present disclosure could acquire the foregoing advantages, and overcome complex road conditions, and move safely and steady under different road conditions.

BRIEF DESCRIPTION OF DRAWINGS

For a clearer understanding of the present invention, the present invention will be described in details below with reference to the accompanying drawings, in which.

DETAILED DESCRIPTION OF INVENTION

Figure 1A:
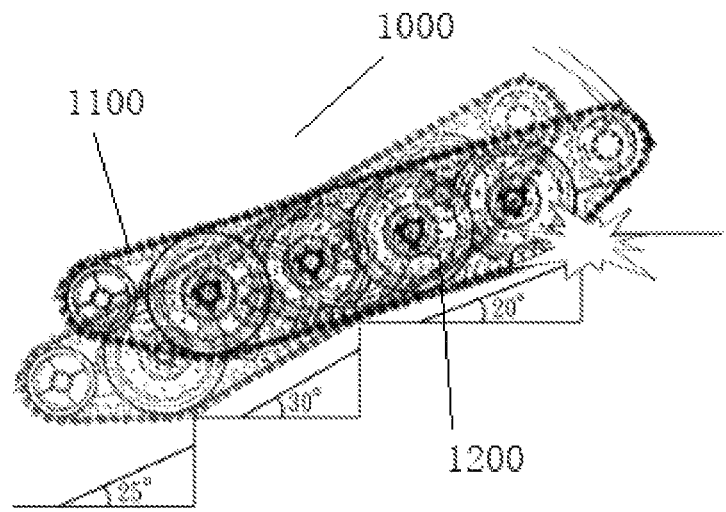
FIG. 1a is a schematic view of dangerous situations occurred when a prior art moving mechanism climbs stairs of various slopes.

Some preferred embodiments of the present invention are set forth below in conjunction with the accompanying drawings, so as to illustrate in details the technical solutions of the present invention.

In the context herein, the "stairs" refers to stairs of the same or different slopes, the "rough road surface and all-terrain ground surface" refers to road surfaces having smooth or wavy, rugged surfaces, or terrains of various slopes.

Referring to FIGS. 1 to 6b, a moving mechanism of the present invention 1 includes a left deceleration driving motor 11 and a right deceleration driving motor 12 (driving mechanism of 11 and 12 may be other drive mechanisms, such as automobile engines, or the like). As the driving principle at both sides are identical, so that only the operation process at either side will be described herein (other known configurations and accessories of the known electric vehicles will not be described herein).

When the left deceleration driving motor 11 is driven by an energy source as instructed by a controller (the energy source may be of battery, gasoline or solar energy), the axle 110 will be driven to rotate by the deceleration driving motor 11, and then the small synchronous wheel 111 and the large synchronous wheel 112 will rotate simultaneously as the wheels 111 and 112 are both fixed on the axle 110. The power of the large synchronous wheel 112 will drive the small synchronous wheel 113 through the synchronous track 143. Fixing plates 162 and 163 will secure synchronous wheels 112 and 113 in place, and the two fixing plate s are provided with bearings between axle and plates, so that the axle is rotatable between plates. The fixing plate 162 and the fixing plate 161 will form an angle and fixedly connected, and the angle is determined based on actual needs, and it may be, for example, 20°, 30° or 40°, and so on.

When the deceleration driving motor 11 drives the small synchronous wheel 111 to rotate, its power will drive the small synchronous wheel 114 through the synchronous transmission track 141. Fixing plate 161 and the support 10 of vehicle body will secure synchronous wheels 111 and 114 in place, and the two fixing plate s and the support are provided with bearings between axle and plates, so that the axle is rotatable between plates.

When the power is transferred to the small synchronous wheel 114, the power will be transferred to the large synchronous wheel 115 through the synchronous wheel connector 15. In other words, the small synchronous wheel 114 and large synchronous wheel 115 effect a synchronous connection via the synchronous wheel connector 15. Both sides of the synchronous wheel connector 15 are provided with bearings, the purpose of which is to allow the power of the deceleration driving motor 11 be transferred to the large synchronous wheel 115 via the small synchronous wheel 114, and concurrently enable the forearm drive axle 20 between those two wheels to rotate freely.

The power of the large synchronous wheel 115 will drive the small synchronous wheel 116 through the synchronous track 142. Fixing plates 164 and 165 will secure synchronous wheels 115 and 116 in place, and the fixing plate 164 is provided with bearings between axle and plate, so that the axle is rotatable between plates. The fixing plate 165 will connect firmly with both the fixing plate 164 and the forearm drive axle 20. That is to say, when the forearm drive axle 20 is rotated, its power will also drive the fixing plates 164 and 165 to swing, and the oscillating movement will not affect the rotation of all of synchronous wheels and the synchronous track transferred from the deceleration driving motor 11.

The forearm motion mechanism 2 includes a left forearm driving electric push rod 21 and a right forearm driving electric push rod 22 (actuating mechanism of 21 and 22 may be other actuating mechanisms, such as deceleration driving motor, hydraulic push rod, or the like). As the driving principle at left side and right side are identical, so that only the operation at the left side will be described herein.

When the forearm driving electric push rod 21 is driven by an energy source to stretch or retract, the power will be transferred to the connecting member 212 to make it rotate forward or backward. Connecting member 212 may be firmly connected with the forearm drive axle 20 and caster wheel/omni-directional wheel 213, that is to say, when the power is transferred to the connecting member 212, the power will concurrently make the forearm drive axle 20 and the omni-directional wheel 213 to rotate/swing forward or backward. The end of the forearm drive axle 20 is connected firmly with the fixing plate 165, so that the fixing plate 165 and the omni-directional wheel 213 will swing forward or backward while the forearm driving electric push rod 21 is stretched or retracted.

The seat balance mechanism 3 includes a seat balance push rod 30 (drive mechanism of 30 may be other drive mechanisms, such as deceleration driving motor, hydraulic push rod, or the like) and a balance sensing element, such as a gyroscope 33 (the gyroscope 33 might be two-dimensional or three-dimensional. If a three-dimensional gyroscope is desired, just add one more push rod, so that the seat can swing back and forth, and left and right).

When the gyroscope 33 has received a message for tilting forward or backward, it will send instructions to the seat balance push rod 30 to make it extend or retract. The rear end of the seat balance push rod 30 will connect with a mobile connection bracket 301, the front end will be connected with a mobile connection member 302, while the mobile connection member 302 also connect with the seat's retractable electric push rod 31. In other words, the telescopic movement of the seat balance push rod 30 will drive the push rod 31 to swing forward or backward through the connecting member 302. In order to fix the seat's retractable electric push rod 31, its one end will be connected with the connection bracket 301, and both sides of the connecting member 302 are provided with a side pulley 303, while a semicircular plate 32 fixed on the support 10 of vehicle body is arranged below the side pulley 303. That is to say, when the seat's retractable electric push rod 31 is pushed or pulled by the seat balance push rod 30, the two side pulleys 303 on its body are rolled forward or backward in fixed track along the two semicircular plates 32, whereby making the seat's retractable electric putt 31 swing forward or backward without deviating from the track.

The seat rotation mechanism 4 includes a drive device, such as deceleration motor 43, and the front end of the deceleration motor 43 is connected with a screw rod 431 (which may be another mechanism, such as a toothed linear push rod, or the like). The deceleration motor 43 is mounted on the connecting bracket 41, and the connecting bracket 41 will be fixed at the foremost end of the seat's retractable electric push rod 31. A gear 421 is arranged at bottom of the swivel bracket 42, and the swivel bracket 42 is connected with the connecting bracket 41 at a joint, at which a plane ball bearing is arranged, that is to say, the swivel bracket 42 could rotate freely on the connecting bracket 41.

When the deceleration motor 43 drives the screw rod 431 to rotate in clockwise direction or counterclockwise direction, the screw rod 431 will drive the gear 421 to rotate, whereby rotating the swivel bracket 42 over the gear.

Based on the foregoing moving mechanism, a seat could be mounted thereon to form an electric vehicle, or a toy could be mounted thereon to form a movable toy, such as a toy car, a toy tank, and so on. In order to describe in details the present disclosure, the description set forth herein is based on an electric vehicle, namely a vehicle, such as a wheelchair, formed by mounting a seat 100 on the swivel bracket 42.

Referring to FIGS. 7a-9h, operation processes of electric vehicles of the present disclosure under different circumstances are set forth as follows:

Mode for getting onto or getting down the wheelchair (see FIG. 9a): In order to facilitate the rider to get onto and get down the wheelchair, the seat's retractable electric push rod 31 will first push the seat to the highest position, and then the seat rotation mechanism 4 is used to rotate the seat by 90 degrees to position it at the middle of the wheelchair, and then the seat's retractable electric push rod 31 will be retracted to its shortest length (see FIG. 8a). In this case, the seat is unblocked at both sides and also situated at its lowest position, whereby facilitating the rider to get onto and get down the wheelchair in the utmost manner.

Mode for moving on even running surface (see FIG. 9b): For enabling the wheelchair to move flexibly in indoors or on an even running surface, the forearm drive electric push rods 21 and 22 will be retracted concurrently to their shortest length, to make the pair of forearms to be rotated and received upwardly (see FIG. 7a), so that the wheelchair becomes shorter on the whole, thereby facilitating the movement of the wheelchair in a relatively narrow environment. Meanwhile, the omni-directional wheels 213 will land on ground, and support and raise up those two large synchronous wheels 115 to make them off the ground. In this way, the moving mode of the wheelchair is changed into such a mode that the wheelchair is driven by those two large synchronous wheels 112 at the rear, and steered freely by those two omni-directional wheels 213 at the front, so that the wheelchair will be very nimble, and could make turns on the relatively narrow road.

Mode for moving on rough road (see FIG. 9c): For moving on the rugged countryside road, the forearm drive electric push rods 21 and 22 will be stretched to predetermined locations, so that the pair of forearms form a specific angle with the ground (see FIG. 7b) while the seat balance mechanism will startup. In this mode, the wheelchair is substantially the same as a four-wheel drive, as both are driven synchronously by four wheels and could easily travel on rough terrain or climb out from the muddy ground. But they differ in that the pair of forearms will play the same role as a tank when encountering a relatively high obstacle, such that the wheelchair could easily climb over the obstacle.

Elevated mode (see FIG. 9d): For catering needs of riders, such as people lame in legs, they could not pick up objects located at relatively high locations by their own, or they want to talk with others at same eye level, the present invention provides specifically the elevated mode to enable the forearm drive electric push rods 21 and 22 to be stretched to their longest length, so that the pair of forearms will support and elevate the body of the vehicle (see FIG. 7d). At the same time, the seat's retractable electric push rod will be stretched to its longest length, so as to improve the field of vision of the rider.

Lie down mode (see FIG. 9e): For catering needs of riders during long time use of their wheelchair, the wheelchair of the present invention provides specifically the lie down mode, so that they could use this mode to take a rest when tired. Firstly, in order to make the wheelchair to be steady, the forearm drive electric push rods 21 and 22 will be stretched concurrently to predetermined locations, so that the pair of forearms will fully lean against the ground (see FIG. 7c), and then make use of the seat rotation mechanism to rotate the seat 100 by 180°, followed by pushing forward the seat's retractable electric push rod 31 by making use of the seat balance push rod 30 (see FIG. 8*c*). The series of such movements will enable the rider to lie down easily. It is also very safe because the pair of forearms will provide support at the back.

Stair climbing mode (see FIG. 9*f*): First of all, the forearm drive electric push rods 21 and 22 will be stretched concurrently to predetermined locations, so that the pair of forearms will fully lean against the ground (see FIG. 7*c*), and then the rider could control those two synchronous tracks 143 at the rear to make touch with the stairs for climbing. Since the middle portion of the wheelchair is of a two wheels like configuration, it is possible to climb up along each stair in a meandering manner, and the wheelchair of the present invention could climb up stairs of various slopes by the complementary action of the synchronous transmission track 141. The pair of forearms at the front provide a pushing action for the climbing operation as those two synchronous tracks 142 could grip firmly the corner of the step, whereby enabling a more powerful climbing operation.

Figure 8A:
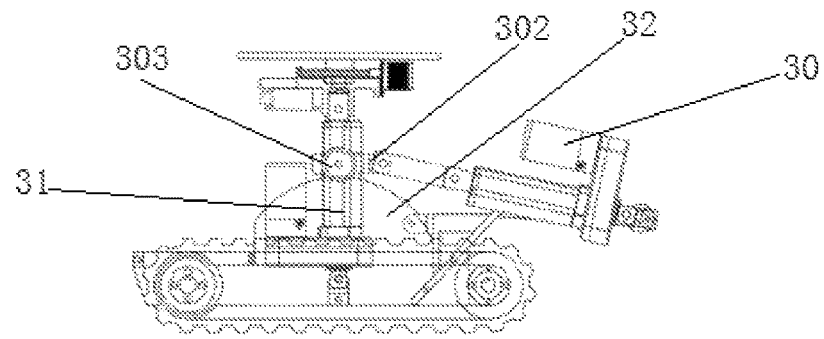
FIG. 8a is an operation schematic view of the seat balance mechanism while moving on a horizontal surface.
Figure 8B:
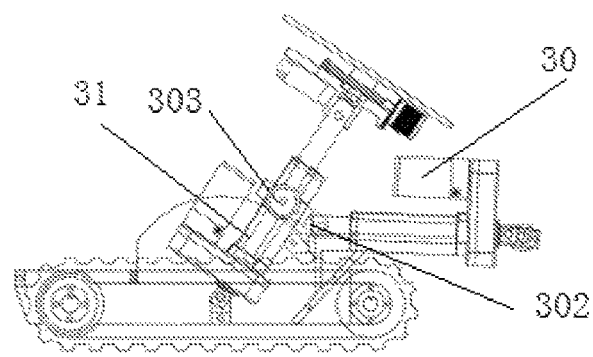
FIG. 8b is an operation schematic view of the seat balance mechanism while moving on stairs or going down a ramp.
Figure 8C:
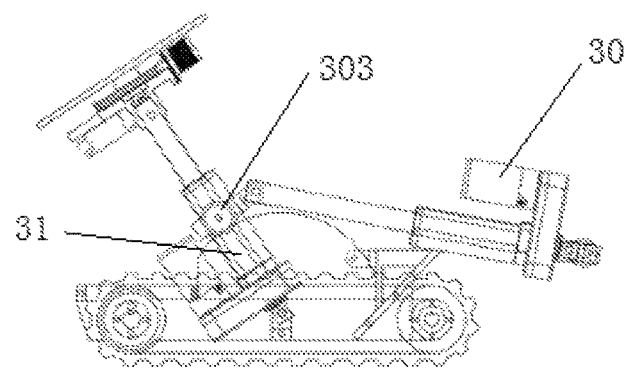
FIG. 8c is an operation schematic view of the seat balance mechanism while going up a ramp or laying down.

While going all the way up or down the stairs, the seat balance mechanism 3 will operate properly, such that the rider could keep vertical balance with respect to ground plane (see FIG. 8*b*).

Figure 1B:
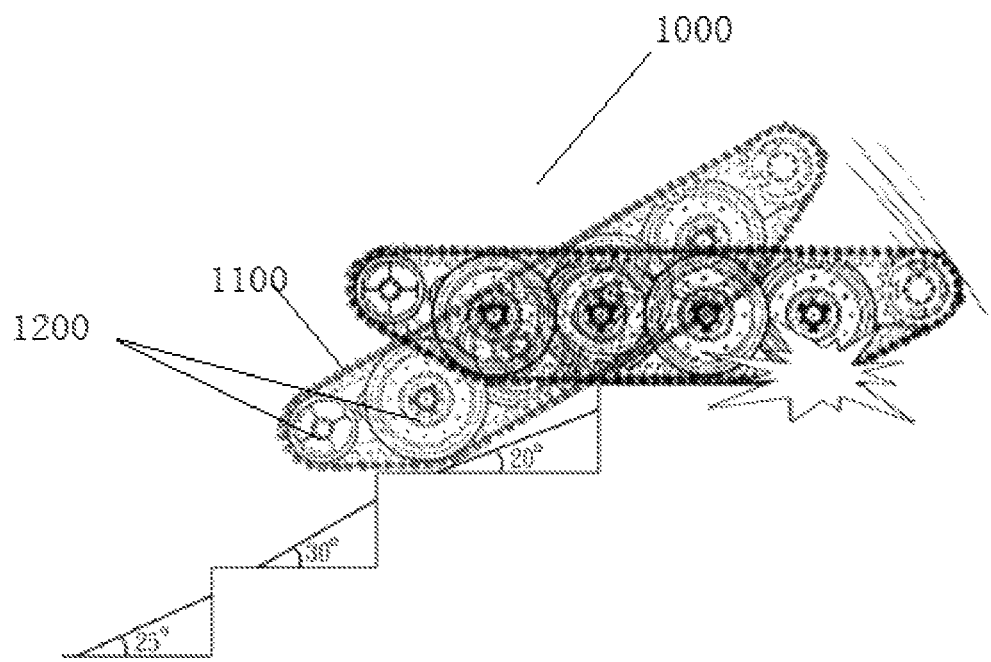
FIG. 1b is a schematic view of dangerous situations occurred when a prior art moving mechanism reaches the top of the stairs.
Figure 1C:
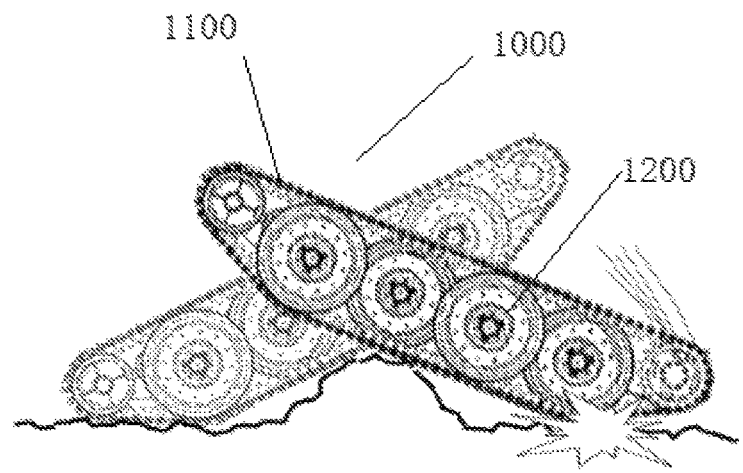
FIG. 1c is a schematic view of dangerous situations occurred when a prior art moving mechanism crosses an obstacle.
Figure 2A:
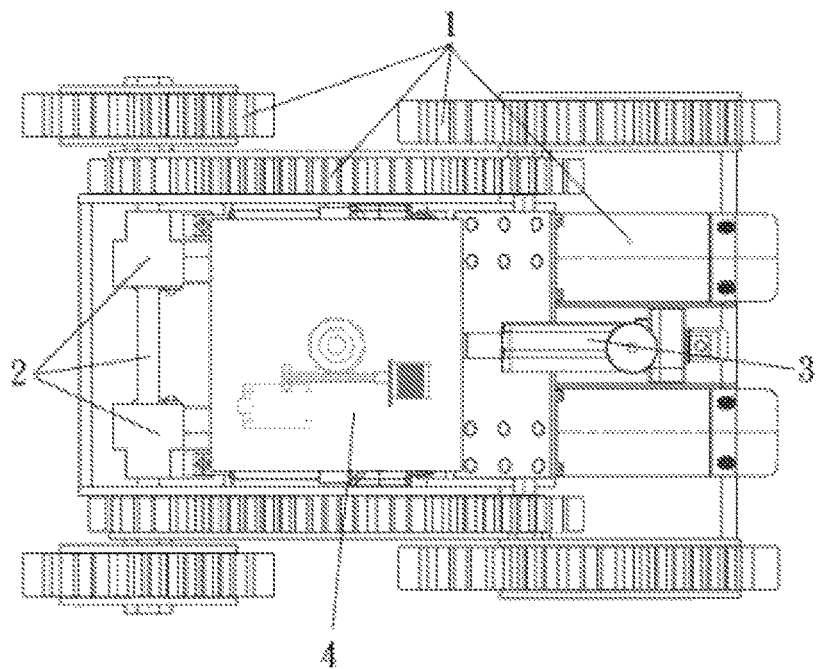
FIG. 2a is a plan view of a moving mechanism of the present disclosure.
Figure 2B:
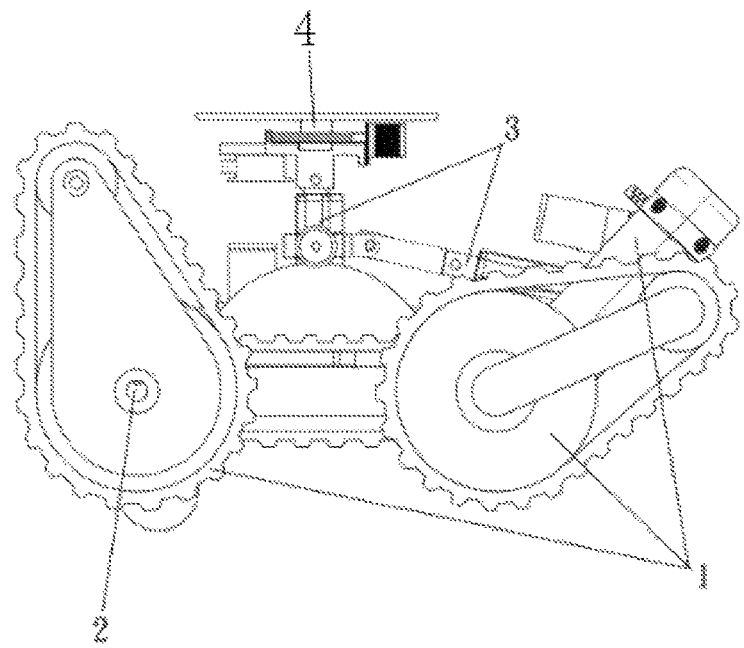
FIG. 2b is a side view of a moving mechanism of the present disclosure.
Figure 3A:
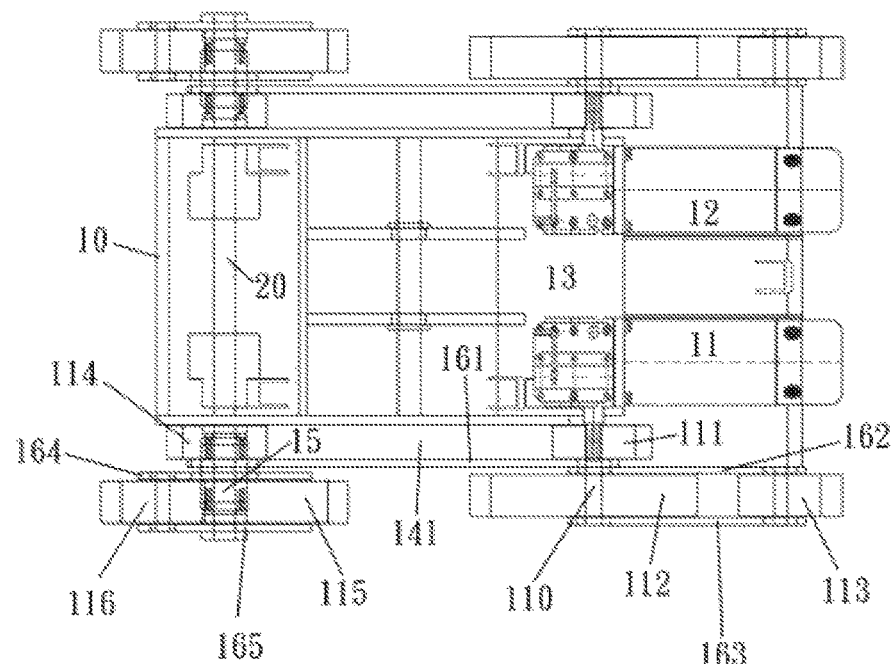
FIG. 3a is a plan view of a moving mechanism of the present disclosure, showing components of the mechanism.
Figure 3B:
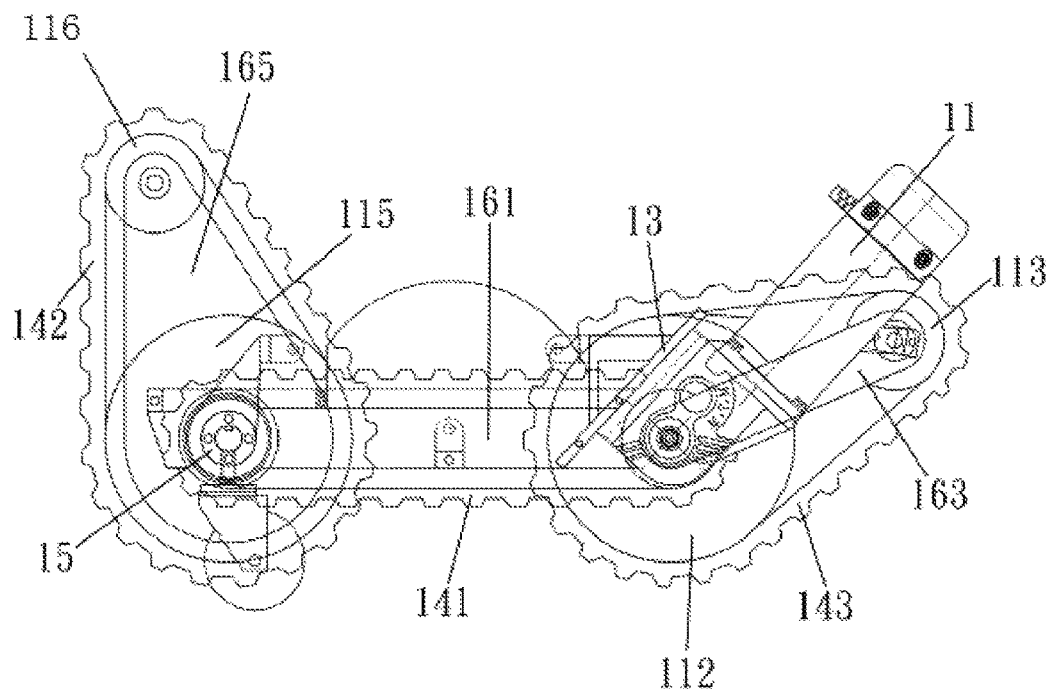
FIG. 3b is a side view of a moving mechanism of the present disclosure, showing components of the mechanism.
Figure 4A:
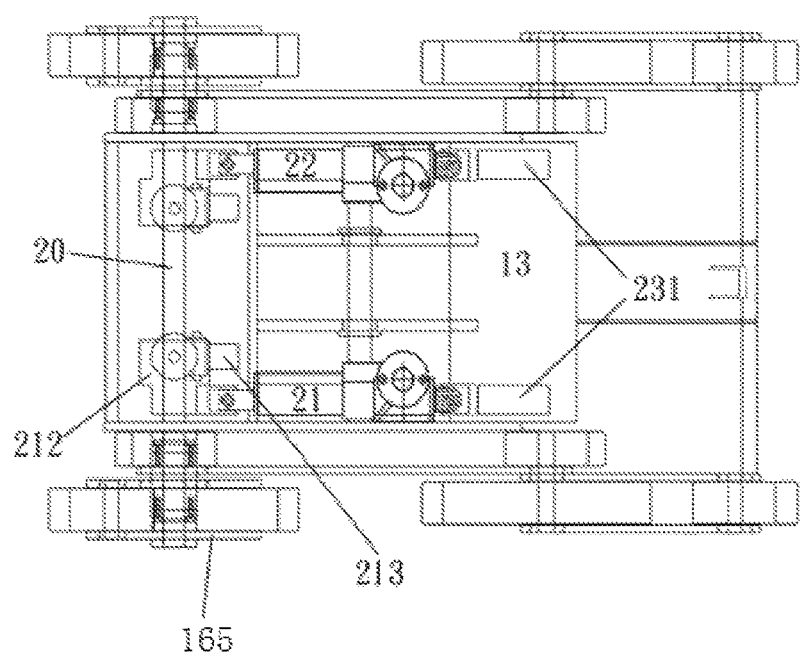
FIG. 4a is a plan view of a forearm motion mechanism of the present disclosure, showing components of the mechanism.
Figure 4B:
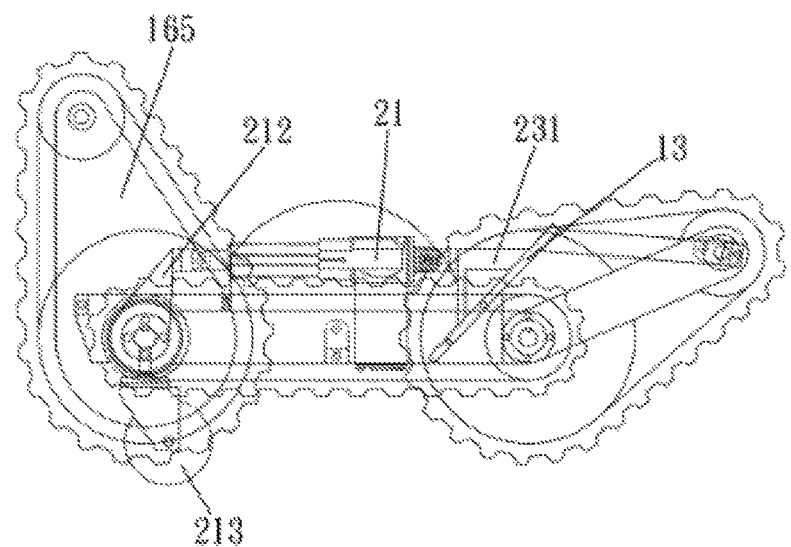
FIG. 4b is a side view of a forearm motion mechanism of the present disclosure, showing components of the mechanism.
Figure 5A:
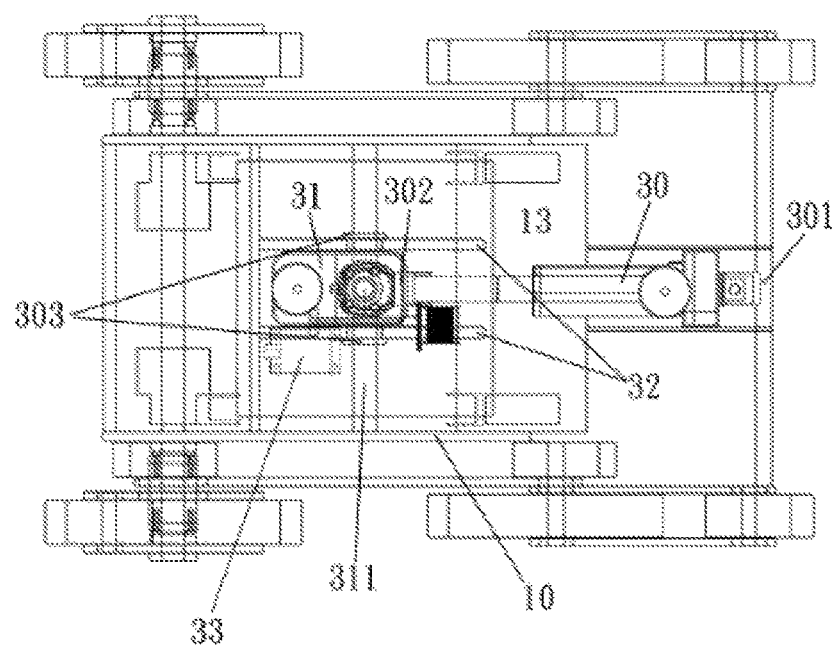
FIG. 5a is a plan view of a seat balance mechanism of the present disclosure, showing components of the mechanism.
Figure 5B:
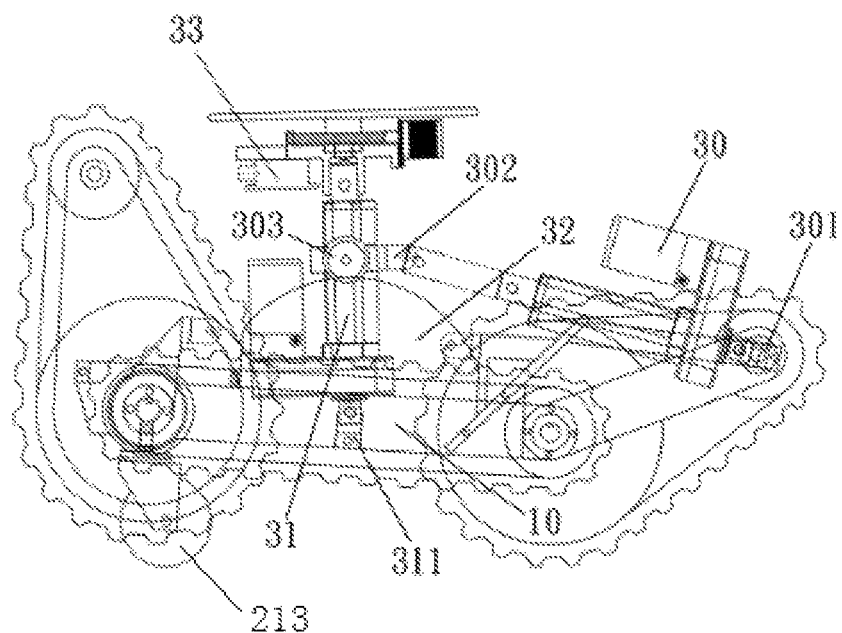
FIG. 5b is a side view of a seat balance mechanism of the present disclosure, showing components of the mechanism.
Figure 6A:
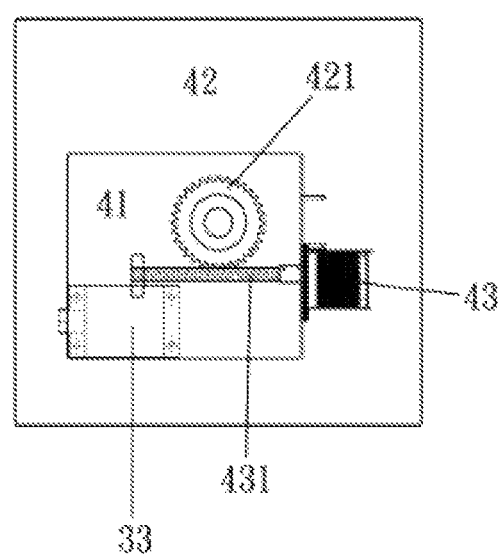
FIG. 6a is a plan view of a seat rotation mechanism of the present disclosure, showing components forming the mechanism.
Figure 6B:
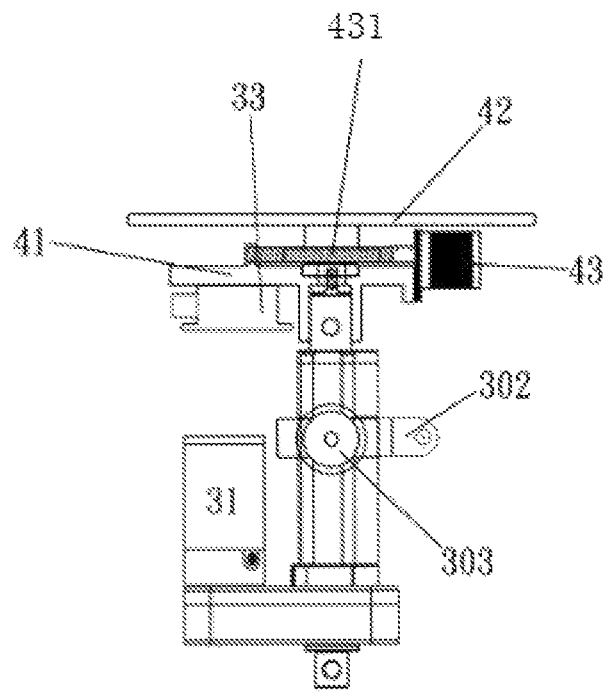
FIG. 6b is a side view of a seat rotation mechanism of the present disclosure, showing components of the mechanism.
Figure 7A:
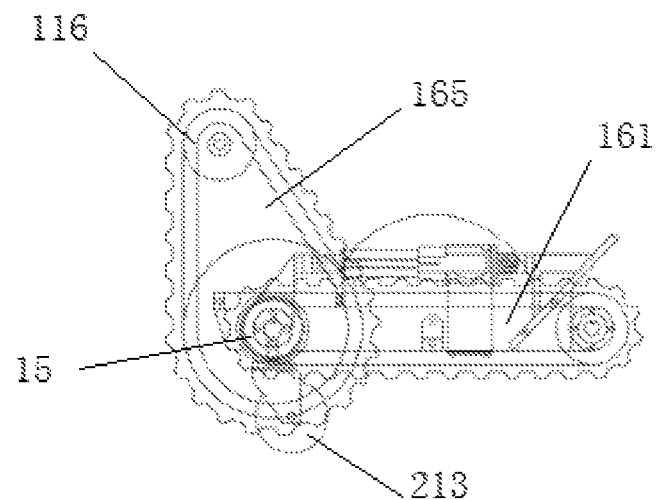
FIG. 7a is an operation schematic view of the forearm motion mechanism while moving on an even road.
Figure 7B:
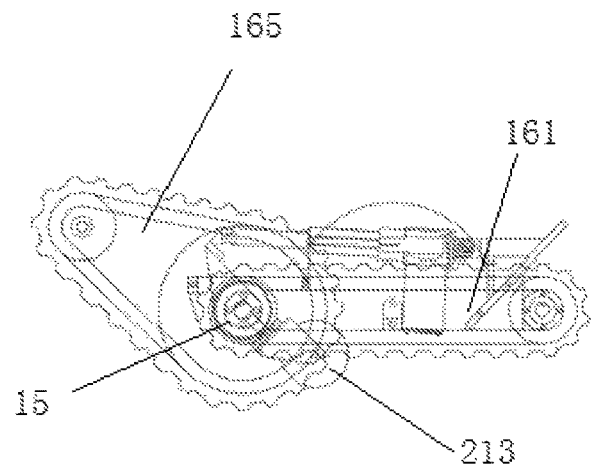
FIG. 7b is an operation schematic view of the forearm motion mechanism while moving on a rough road.
Figure 7C:
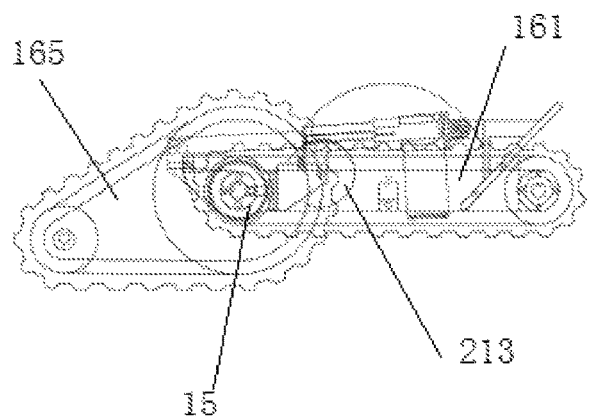
FIG. 7c is an operation schematic view of the forearm motion mechanism while climbing stairs.
Figure 7D:
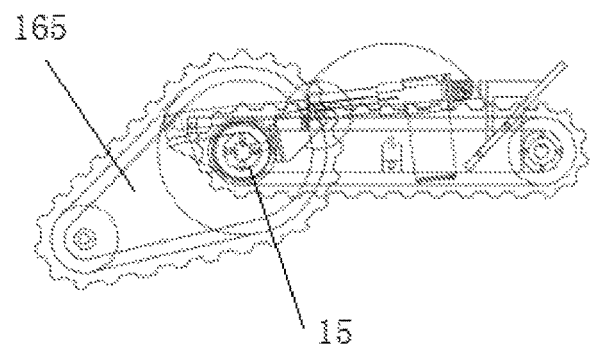
FIG. 7d is an operation schematic view of the forearm motion mechanism while crossing an obstacle or improving visibility.
Figure 9A:
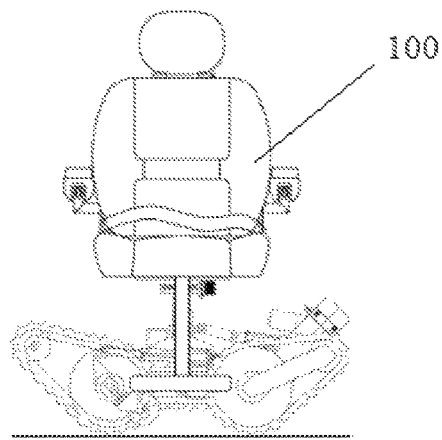
FIG. 9a is an operation schematic view of the electric vehicle of the present disclosure when the seat is rotated to the middle position to facilitate the rider to get onto or get down the seat under the circumstances that both sides are unblocked.
Figure 9B:
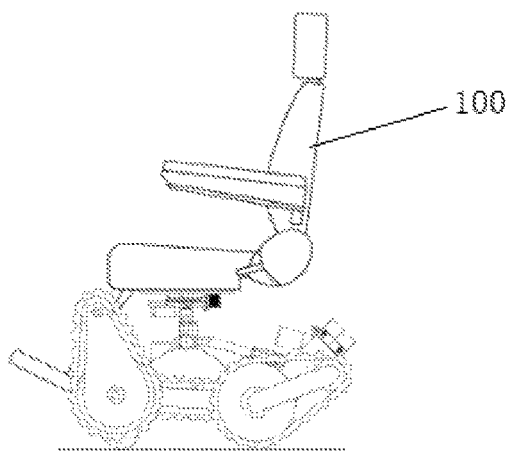
FIG. 9b is a schematic view of the electric vehicle of the present disclosure moving in a coast mode on an even road by having omni-directional wheels running on the ground.
Figure 9C:
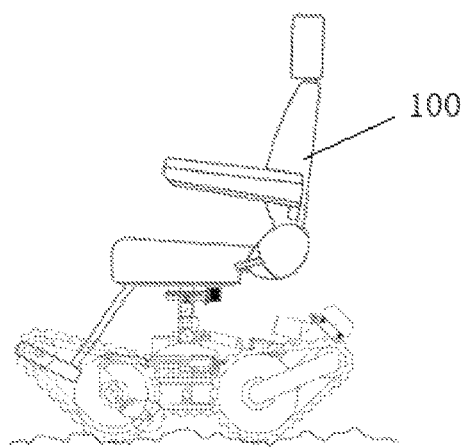
FIG. 9c is a schematic view of the electric vehicle of the present disclosure moving in a rough mode on a rough road and driven by four wheels in a four-wheel drive mode.
Figure 9D:
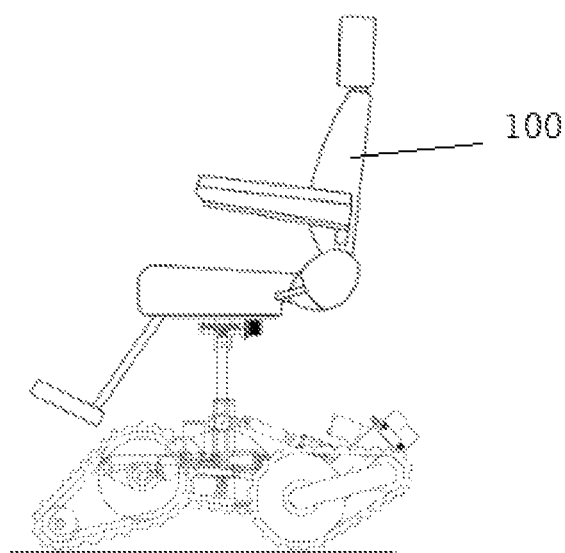
FIG. 9d is a schematic view of the electric vehicle of the present disclosure in an elevated mode when the rider wants to pick up objects located at relatively high locations, or talk with a friend at same eye level.
Figure 9E:
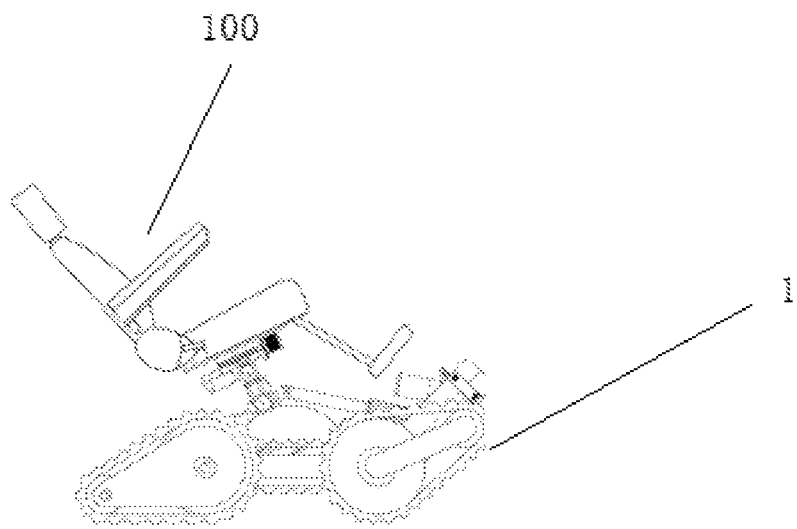
FIG. 9e is a schematic view of the electric vehicle of the present disclosure in a lie down mode when the rider wants to lie down to take a rest.
Figure 9F:
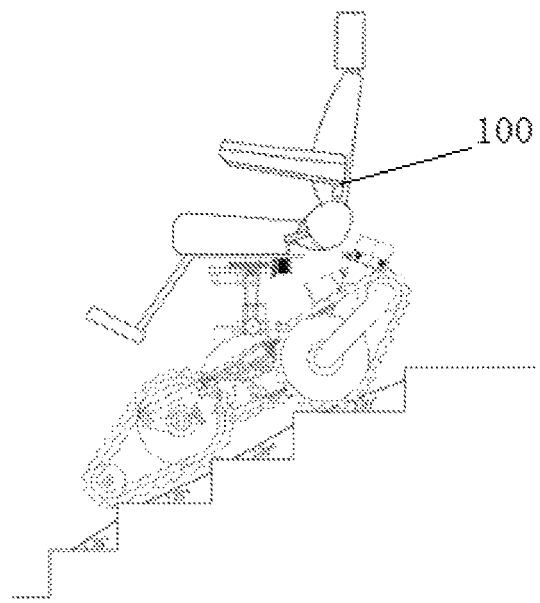
FIG. 9f is a schematic view of the electric vehicle of the present disclosure in a stair climbing mode when climbing up and down the stairs.
Figure 9G:
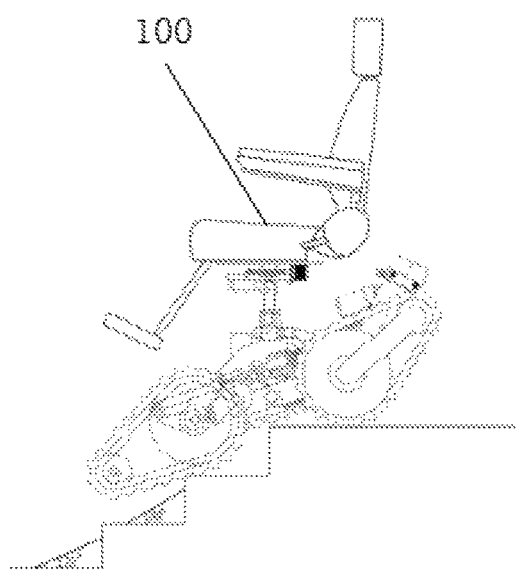
FIG. 9g is a schematic view of the electric vehicle of the present disclosure reaching the top of the stairs with the middle part of its vehicle body in a configuration mode resembles two wheels, such that it is very stable and safe during landing.
Figure 9H:
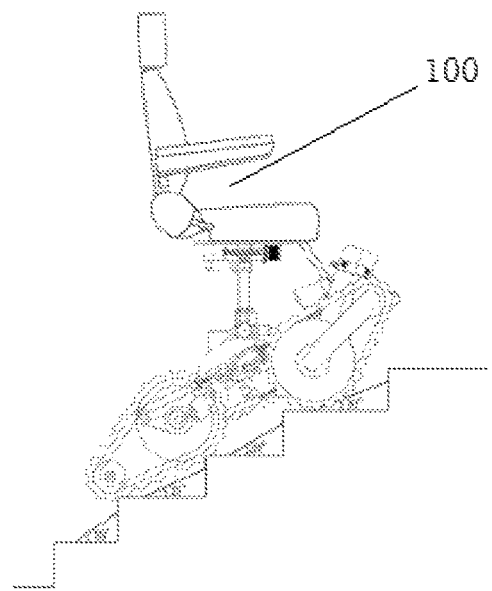
FIG. 9h is a schematic view of the electric vehicle of the present disclosure in a adoptable reverse mode for going up and down the stairs when the rider wants to face the stairs during operation.

As the middle portion of the wheelchair is of a two wheels like configuration, when the wheelchair reaches the top of the stairs, it will not has the risk of suffering a sudden fall as a full-track type vehicle does (as shown in FIG. 1*b*), and in turn, it could reach the top of the stairs in a very steady and safe manner (see FIG. 9*g*).

The case of going down the stairs is basically the same as going up the stairs. By adopting the same mode, the wheelchair will not has the risk of suffering a sudden fall when it reaches the first stair, as the middle portion of the wheelchair is of the two wheels like configuration (see FIG. 9*g*).

Reverse mode (see FIG. 9*h*): It will be difficult for some riders to climb up the stairs by facing backward, but climbing up the stairs by facing forward will require the seat to be elevated substantially to make the center of gravity to move backward significantly to ensure the safety thereof. Firstly, the seat must be reversed by rotating an angle of 180 degrees by the seat rotation mechanism 4. When climbing up the stairs, the seat's retractable electric push rod 31 needs to be stretched to its longest to enable the seat to have the maximum magnitude of swing, such that the rider could be rode in the safest manner.

Figure 10:
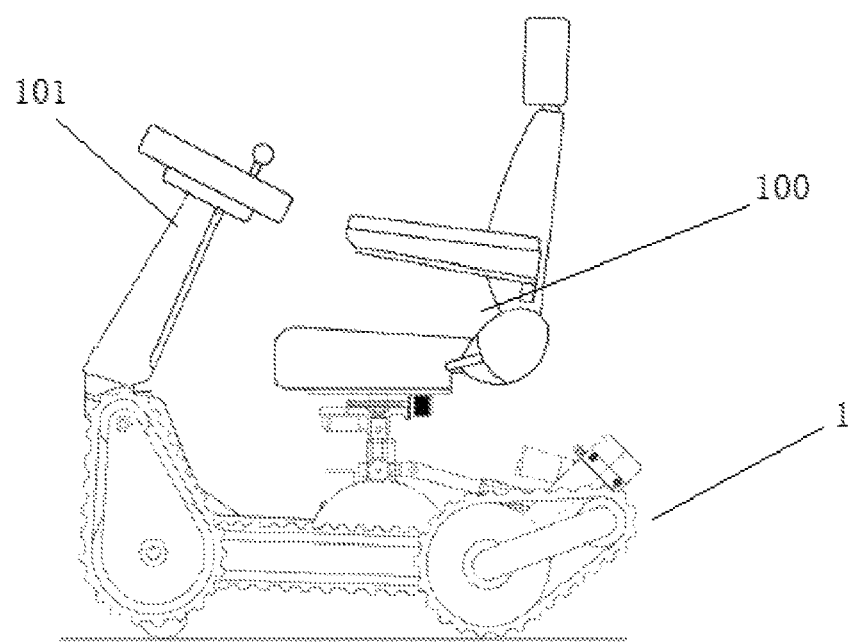
FIG. 10 is a schematic view of the electric vehicle of the present disclosure, wherein an armrest is added and arranged in front of the seat.

As shown in FIG. 10, according to a preferred embodiment of the electric vehicle of the present invention, the electric vehicle further includes an armrest 101 arranged at the support, and positioned in front of the seat 100 for easy grip of the user and allowing the electric vehicle to be controlled to perform moving and/or climbing operations by the user via a button arranged on the armrest 101 (not shown), or allowing the control of the lifting or rotation operations of the seat 100, whereby facilitating significantly the user operation and the use of the electric vehicle.

The specific embodiments described in details above have further illustrated the technical problem to be solved, technical solutions and advantageous effects of the present invention. It should be understood that the above are only some of the specific embodiments of the present invention without limiting the present invention, while any modification, equivalent replacement and improvement made within the essences and principles of the present invention shall all fall into the scope of the present invention.

The invention claimed is:

1. A moving mechanism, comprising:
   a support;
   a driving device mounted on the support;
   a controller arranged on the support;
   two sets of moving assemblies respectively mounted at two ends of the support; wherein each of the moving assemblies includes a track and two synchronous wheels of different diameters arranged inside the track;
   a forearm drive axle mounted on the support and arranged between the two synchronous wheels of different diameters; and
   an omni-directional wheel connected with the forearm drive axle via a connecting member, so as to swing;
   whereby the moving mechanism moves freely over stairs, rugged road surfaces and all-terrain ground under action of the driving device and the controller.

2. The moving mechanism of claim 1, wherein one of the two synchronous wheels of different diameters and an auxiliary synchronous wheel are both mounted on an axle, such that the one of the two synchronous wheels of different diameters and the auxiliary synchronous wheel are rotated concurrently.

3. The moving mechanism of claim 2, wherein the two synchronous wheels of different diameters are respectively provided with a fixing plate, which allows the axle to rotate with respect to the fixing plate via a bearing.

4. The moving mechanism of claim 3, wherein the forearm drive axle is connected with the fixing plate at both ends, so as to make the fixing plate swing when the forearm drive axle rotates.

5. The moving mechanism of claim 4, wherein the forearm drive axle is driven by a forearm motion mechanism, the forearm motion mechanism comprises a first forearm driving electric push rod and a second forearm driving electric push rod connected with the forearm drive axle, so as to drive the forearm drive axle to rotate or swing.

6. The moving mechanism of claim 1, wherein a synchronous track is arranged between the moving assemblies, so as to implement synchronous transmission of power between the synchronous wheels.

7. The moving mechanism of claim 1, wherein a synchronous wheel connector is arranged between the two synchronous wheels of different diameters, so as to transfer power between the two synchronous wheels of different diameters.

8. The moving mechanism of claim 1, wherein a plurality of teeth are arranged on the track.

9. An electric vehicle comprising a body part and a seat, further comprising a moving mechanism of claim 1, such that the electric vehicle moves freely over stairs, rugged road surfaces and all-terrain ground surfaces by making use of the moving mechanism.

10. The electric vehicle of claim 9, wherein the electric vehicle further comprises a seat adjustment mechanism connected with the seat and configured to effect an up and down adjustment of the seat in a direction perpendicular to the body part, or a horizontal adjustment of the seat in a direction parallel to the body part, or an adjustment of the seat in a rotary manner, so that the seat is moved up and down and left and right, or rotatably adjusted in directions from 0° to 360°.

11. The electric vehicle of claim 10, wherein the seat adjustment mechanism comprises a seat balance mechanism comprising:
   a seat balance push rod arranged under the seat to drive the seat to move in one direction or two directions;

a balance sensing element for sensing an information on whether the seat is deviated, and transmitting the information to a control unit; and;

the control unit is electrically connected with the seat balance push rod and the balance sensing element to receive the information transmitted by the balance sensing element, and control the seat balance push rod according to the information, so as to maintain balance of the seat.

12. The electric vehicle of claim 11, wherein the balance sensing element is a gyroscope.

13. The electric vehicle of claim 11, wherein the seat adjustment mechanism comprises a seat rotation mechanism comprising:
   a connecting bracket fixedly connected with one end of the seat of the seat balance push rod;
   a driving device mounted on the connecting bracket;
   a swivel bracket connected with the connecting bracket at a joint, at which a ball bearing is arranged; and
   a screw rod arranged at one end of the driving device and driven by the driving device to rotate, and drive the swivel bracket to rotate.

14. An electric vehicle of claim 13, wherein the seat adjustment mechanism further comprises a gear arranged at one end of the swivel bracket, and rotated collaboratively with the screw rod.

15. The electric vehicle of claim 13, wherein the driving device is a deceleration motor.

16. The electric vehicle of claim 9, wherein the electric vehicle further comprises an armrest arranged at the support, and positioned in front of the seat for easy grip and allowing the electric vehicle to be controlled via a button arranged on the armrest.

17. A toy, comprising a moving mechanism of claim 1, such that the toy moves freely over stairs, rugged road surfaces and all-terrain ground surfaces by making use of the moving mechanism.

* * * * *